INVENTOR
John Ronald Parks
BY
Cushman, Darby & Cushman
ATTORNEYS

Aug. 8, 1967 J. R. PARKS 3,335,284

PRINTED OR WRITTEN CHARACTER RECOGNIZING APPARATUS USING ELECTROSTATIC PATTERN STORAGE

Filed Dec. 2, 1963 4 Sheets-Sheet 2

INVENTOR

John Ronald Parks

By Cushman, Darby & Cushman

ATTORNEYS

Aug. 8, 1967 J. R. PARKS 3,335,284

PRINTED OR WRITTEN CHARACTER RECOGNIZING APPARATUS USING ELECTROSTATIC PATTERN STORAGE

Filed Dec. 2, 1963 4 Sheets-Sheet 3

INVENTOR

John Ronald Parks

By Cushman, Darby & Cushman

ATTORNEYS

INVENTOR
John Ronald Parks
BY
Cushman, Darby & Cushman
ATTORNEYS

United States Patent Office 3,335,284
Patented Aug. 8, 1967

3,335,284

PRINTED OR WRITTEN CHARACTER RECOGNIZING APPARATUS USING ELECTROSTATIC PATTERN STORAGE

John Ronald Parks, Teddington, Middlesex, England, assignor to National Research Development Corporation, London, England, a corporation of Great Britain Filed Dec. 2, 1963, Ser. No. 327,196
Claims priority, application Great Britain, Dec. 7, 1962, 46,331/62
16 Claims. (Cl. 250—219)

This invention relates to systems and arrangements for the recognition of printed or written characters such as letters and numerals employing self-matching methods, for example, as described in U.S.A. Patent No. 3,196,395 May 15, 1961, by M. B. Clowes and J. R. Parks or similar methods involving the comparison or matching of images. In the self-matching method described in the above patent a scanning operation is effected over the character sought to be recognised with an identical image or with a number of identical images of such character, each image being displaced with respect to the character by a different amount, and observation made during the scanning cycle of the varying degrees of overlap or agreement between the character and the image or all of the different and displaced images. The identical image or each of the separate images used is a copy of the whole or part of the character and is produced automatically.

In the abovementioned patent the production of the images and their displacement and the subsequent scanning movement is effected by optical methods whereas in another of the applications an equivalent effect is produced by means of electric signals produced by scanning the character with flying light spot.

The application of such self-matching or similar shifted image techniques for use in a general purpose high speed character recognition system presents certain difficulties. The existing flying light spot scanning method is limited in its application while the optical methods are inherently somewhat slow since they involve mechanical movement of optical elements.

The object of the present invention is to provide an improved system and arrangement having the flexibility of optical devices coupled with the potentially high speeds available in electronic devices.

Broadly in accordance with the invention the transparencies used in the aforementioned optical systems are replaced by dielectric storage meshes on which charge density patterns representing the character or characters under recognition are impressed and such charged meshes are then transilluminated by a uniform electron flood beam directed serially through the respective charged meshes so that the emergent electron flux represents, in a manner similar to that of the light passing through the several transparencies in the optical system, the self-matching function of the character or characters under recognition.

By the use of several serially arranged dielectric storage meshes each copy of the character concerned can be effectively shifted with respect to the other copies by deflecting the trajectories of the flood electrons as they pass between the storage meshes. This deflection may be effected by known means such as electrostatic deflector plates or, more conveniently, conventional electromagnetic deflection coils disposed around the path of the flood electrons.

In order that the nature of the invention may be properly understood a number of embodiments thereof will now be described by way of illustrative example and with reference to the accompanying drawings in which.

Figure 1:
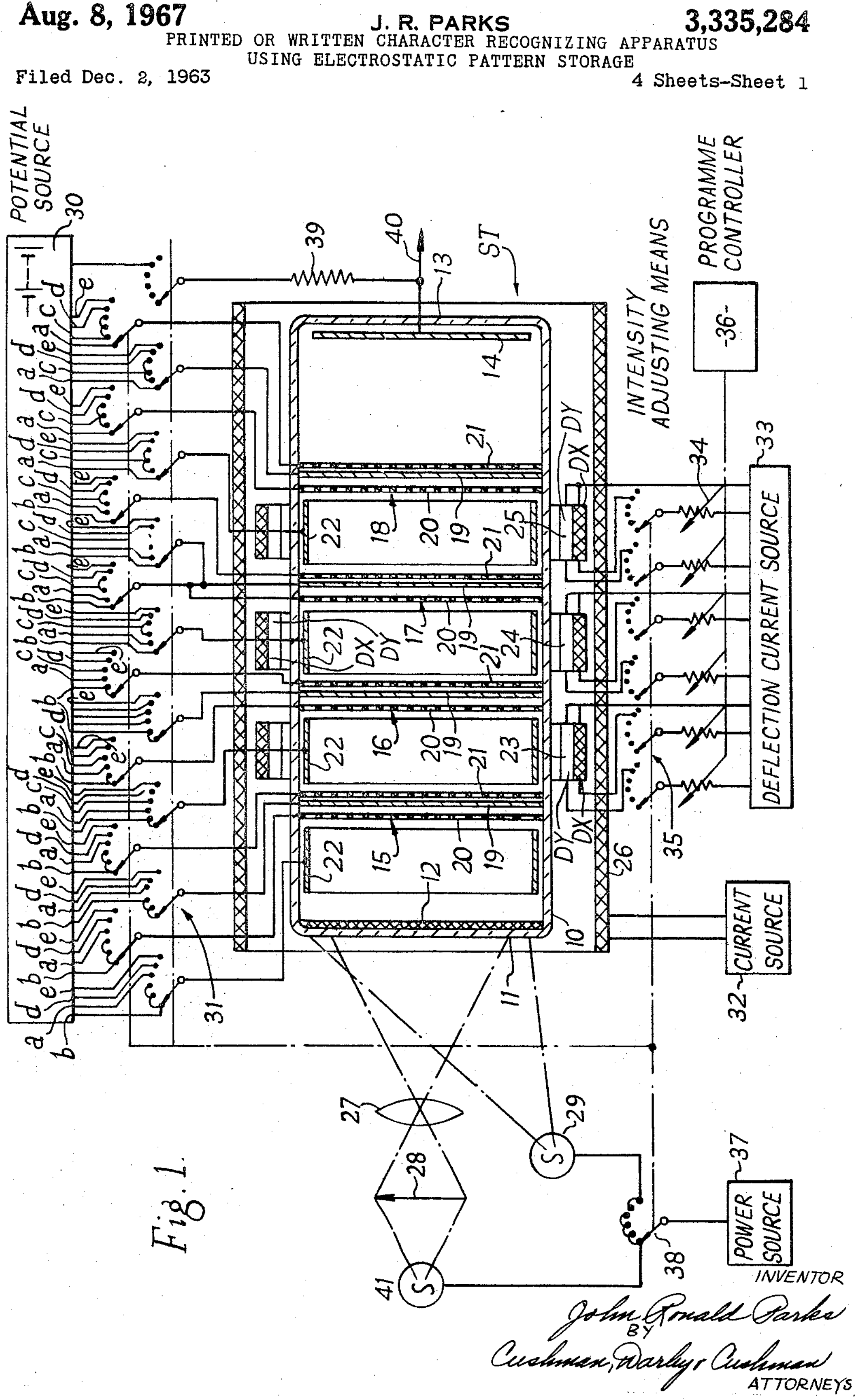
FIGURE 1 is a view, showing a multiple storage mesh tube in axial cross section in combination with a largely schematic diagram of associated apparatus according to one practical form of the invention.
Figures 2, 3:
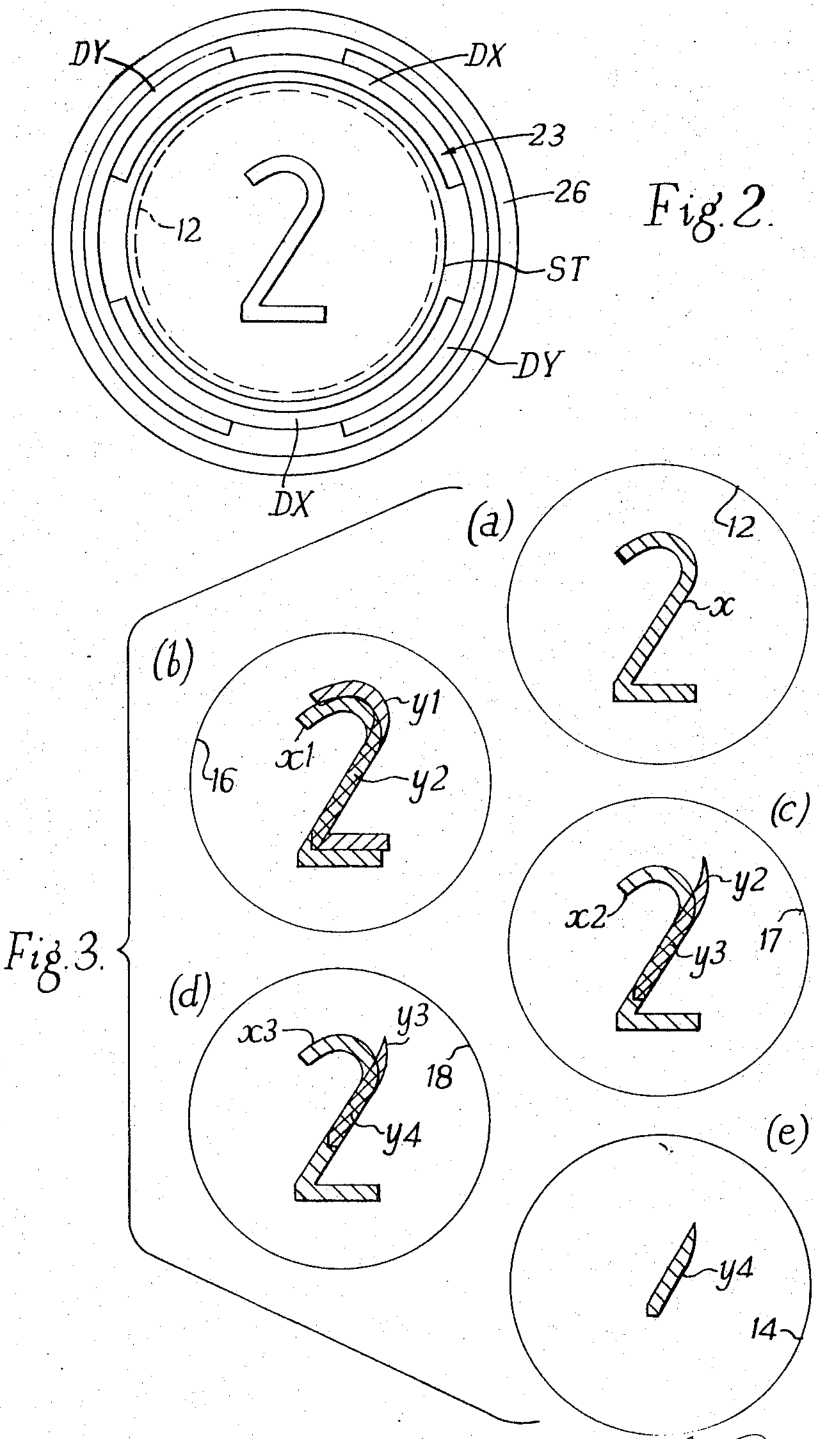
FIGURE 2 is an end view of the storage tube of FIG. 1 showing certain associated beam deflection and focussing coils.

FIGURE 3 comprises diagrammatic views (a), (b), (c), (d) and (e) illustrating one example of an autocorrelation process performed with the arrangement shown in FIGS. 1 and 2.

Figure 4:
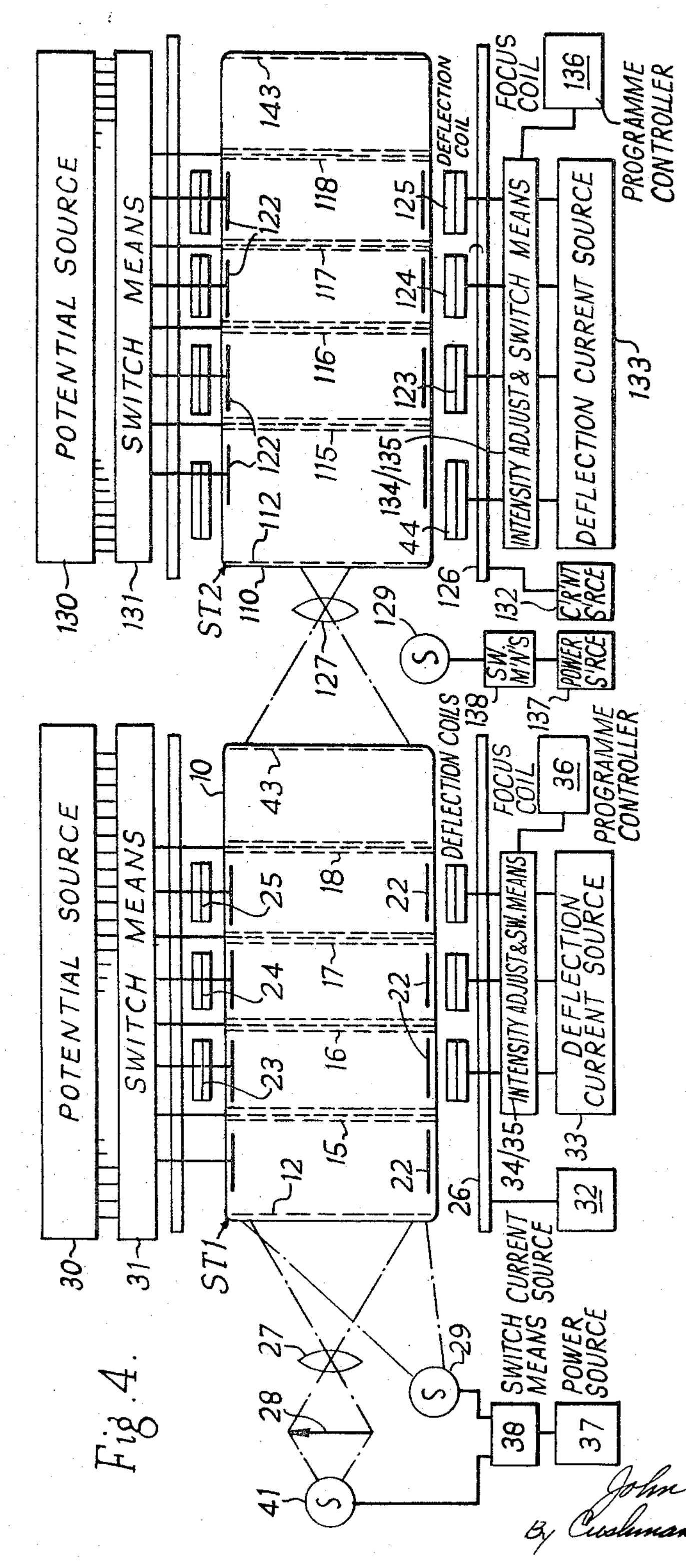

FIGURE 4 is a view, similar in form to FIG. 1 showing another embodiment of the invention and employing slightly different forms of storage tube.

Figure 5:
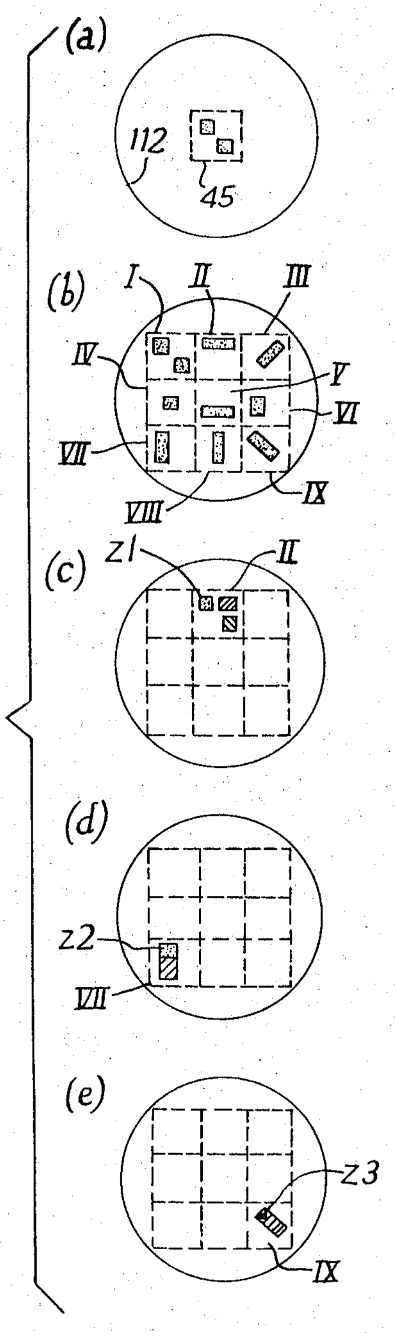

FIGURE 5 comprises a series of diagrammatic views (a), (b), (c), (d) and (e) similar to FIG. 3, illustrating another example of an image matching or comparison process performed with the arrangement shown in FIG. 4.

Referring first to FIGS. 1–3, ST indicates a storage tube comprising an evacuated envelope 10 of elongated cylindrical form closed at one end by a planar wall 11 adjacent which is disposed a photo-cathode surface 12. The opposite end of the tube is closed by a similar planar wall 13 adjacent which, inside the tube, is mounted a collector plate 14 while between the photo-cathode surface 12 and the collector plate 14 are disposed four axially spaced parallel storage mesh groups 15, 16, 17 and 18. Each storage mesh group comprises a dielectric storage mesh 19 flanked on the cathode side by a conductive collector mesh 20 and on the opposite side by a field mesh 21. The function of each mesh 20 is to provide an accelerating field between the cathode and the first mesh group and between each pair of mesh groups; it also serves to collect secondary electrons emitted during operation. The field meshes 21 operate each to ensure a uniform electrostatic field between adjacent mesh groups; each is placed as close as possible to its associated dielectric mesh 19.

Inside the envelope, conveniently deposited on the inner surface of such envelope, and in between each pair of storage mesh groups is provided an anode or collector ring electrode 22 while around the outside of the envelope, in alignment with the spaces between each adjacent pair of storage meshes, is provided separate sets of deflection coils 23, 24 and 25. As shown in FIG. 2, each set of deflection coils preferably includes two separate pairs of coil windings DX and DY for causing deflection of the tube electron beam in X and Y directions perpendicular to one another after the style of conventional C.R.T. deflection coils.

The complete assembly of tube and deflection coils is disposed within elongated focussing solenoid winding 26. The arrangements further include an optical lens system 27 by which a character indicated at 28 may be imaged on the surface of the photo-cathode 12 when illuminated by a light source 41. In the drawing the light source 41 is shown as operative to transilluminate a character which is carried by a positive or negative type transparency but the character may equally well be carried by a non-transparent surface and illuminated from the side opposite that shown for the light source 41 whereby the image on the photo-cathode 12 is produced by reflected light. A separate source of illumination 29 is provided for flooding the surface of the photo-cathode 12 with light of uniform intensity when required.

The construction of the tube ST1 including its photocathode and its dielectric storage mesh groups may follow the practices now well known and established in connection with image convertor tubes and data storage tubes.

Thus, the dielectric storage meshes 19 are conveniently fine pitch fine wire meshes coated on the side facing the photo-cathode 12 with silica, magnesium fluoride or similar material having the properties of high secondary emission coefficient combined with low cross-over potential, good insulation and dielectric strengths and comparatively low dielectric constant in order that thin coatings may be employed without producing a large capacity between the coating surface and its support mesh.

The photo-cathode 12 must be capable of emitting high uniformly distributed electron current and with a view to reducing thermal emission due to local heating which may be brought about by absorption of incident light energy and/or ohmic dissipation caused by current flow in the cathode material, the photo-cathode surface is preferably deposited upon a transparent electrically conductive substrate. The end wall 11 may be formed of conductive glass or alternatively it may be coated on the inside with a transparent layer of gold or platinum. In another alternative construction a conductive mesh system is first deposited on the inner end surface of the tube so that any heating effects due to current flow in the cathode material are limited to those due to current flow within the apertures of the mesh.

The various operating potentials applied to the different electrodes during the respective operating phases of effecting image storage as a charge pattern upon each dielectric storage mesh, maintaining such charge pattern and subsequently erasing it in readiness for use of the arrangement with a different image likewise follow already well known principles but for completeness typical values for such operating potentials will be given later. Such potentials are shown as supplied from a source 30 which is depicted, symbolically, as a battery but which, in practice, may be of any convenient known form. A range of different potentials, suitable for the manner of operation during each of the different operating phases is available from the source 30 and these different potentials are shown applied to the various elements of each mesh group and the associated anodes 22 by way of switch means 31. Such switch means are shown for simplicity of illustration as a group of ganged multiple-position mechanical switches but in practice they may, of course, be of any suitable form such as electromagnetic relay contacts, electronic switch devices using thermionic or solid state devices or motor driven commutator type mechanisms. The focussing winding 26 is shown energised from a suitable current supply source 32 also depicted symbolically as a battery while the respective deflection coil windings DX and DY of the separate sets of deflection coil windings 23, 24 and 25 are each shown supplied with appropriate beam deflecting currents from a common source 33 by way of individual intensity adjusting means 34 and distributor switch means 35. Such switch means 35 are, like the switch means 31, shown for simplicity as a group of multiple-position mechanical switches ganged for operation in unison with the switch means 31 to apply deflection currents during the appropriate phase or phases of each operation cycle as well as will be described later but again such switch means may, in practice, be of any convenient form including those already mentioned for the switch means 31. As will become apparent from the following description of the manner of operation, the values of deflection current applied to the different deflection coil windings DX and DY will vary in accordance with the form of image shift test being performed at any one time upon any particular applied character image and to allow for the performance of a series of different tests upon a given image in rapid succession the individual intensity adjusting means 34 are shown symbolically as variable resistors each of which is controlled as to its value at any given instant by a programme controller 36 which may, for example, be a series of motor driven cams, each cam controlling its related variable resistor 34 in accordance with a predetermined operation cycle. In practice, the variable resistors may each be replaced by a group of fixed value resistors which are selected for inclusion in the deflection current supply circuit by electronic or electromechanical switching means operated in the appropriate sequence by signals from the programme controller 36 which may then comprise a programme record store on punched or magnetic tape or may comprise a stepping counter circuit arrangement for providing the appropriate control signals. The light sources 29 and 41 are also shown energised from a suitable power source 37 by way of a control switch 38 ganged for operation in unison with the switch means 31 and 35. The supply lead from the source 30 to the final collector plate 14 includes a load resistor 39 across which are developed output signals made available on output signal lead 40.

Before describing the manner of operation of the arrangement, attention is directed to the reference legends applied to the different potential supply leads from the source 30 to the switch means 31. Those labelled *a* each provide a potential appropriate for setting up a charge pattern on the storage mesh group to which they are applied, those labelled *b* provide a potential appropriate for rendering the storage mesh group to which they are applied effectively transparent to the tube beam, those labelled *c* provide a potential appropriate for holding a charge pattern in the storage mesh group to which they are applied, those labelled *d* provide a potential suitable for operating the charged storage mesh group to which they are applied as a modulating influence upon tube beam incident thereon while those labelled *e* provide potentials suitable for erasing any existing charge pattern from the storage mesh group to which they are applied. The actual values of each of such potentials will, of course, depend upon the construction and chosen operating conditions of the storage tube.

To describe the operation of this arrangement one complete operation cycle will be followed through its several phases marked by the progression of the switch means 31, 35 and 38 from their first contact position to their sixth and last position. With appropriate constant energisation of the focussing coil winding 26 from the source 32, the switch means 31, when in position 1, cause the application of *b* level potentials to the various elements of the storage mesh groups 15, 16 and 17 to render these effectively transparent to the tube beam and *a* level potentials to the storage mesh group 18 to render this in a charge receiving condition. Simultaneously switch means 35 ensure that no deflection currents are applied to any of the deflection coil windings 23, 24, 25 while switch means 38 causes energisation of the light source 41 whereby the character 28 which is to be recognised is imaged optically upon the photo-cathode 12 as shown, by way of example at (*a*) in FIG. 3, to produce an electron image-representing beam from the inner side on such photo-cathode. Such electron image beam is projected through the, now inoperative storage meshes 15, 16, 17 and is effective upon the final storage mesh group 18 where a representation of the character 28 is set up on the associated dielectric storage mesh 19 as a pattern of either negative or positive charge. FIG. 3(*a*) is again representative of the charge pattern on such dielectric storage mesh.

In the setting up or writing of a positive charge image on a storage mesh group and assuming that the surface of the dielectric mesh 19 is at a uniform potential close to that of its support mesh as a result of a previous erase operation (which will be described later), such dielectric mesh is raised in potential by its applied potential level *a* to above the cross-over point for the dielectric material used, say +2 kv., with reference to the photo-cathode 12 while the associated collector mesh 20 is raised by its applied *a* level potential about +100 to +200 v. above that of the dielectric mesh. The associated field mesh 21 is held by its applied *a* level potential at about +50 v. relative to the photo-cathode 12. In the storage mesh groups 15, 16 and 17 lying in front of the mesh group 18, the dielectric meshes 19 each must have the dielectric surface thereof at the potential of the photo-cathode 12 and this is obtained by making the *b* level potential applied to their support meshes equal but opposite to the potential remaining between the dielectric surface and the support mesh after the erasure operation. The collector meshes 20 of these preceding mesh groups 15, 16 and 17 are held by their *b* level potentials at a few hundred volts positive, say +200 v., with respect to the associated field meshes 21 whose applied *b* level potentials are, say, +50 v. with respect to the photo-cathode 12.

Electrons arriving from the photo-cathode 12 at the dielectric storage mesh 19 will liberate a greater number of secondary electrons. These will be collected by the collector mesh 20 thereby leaving a positively charged image of the character on the dielectric storage mesh 19 with some +10 to +20 v. difference between its "exposed" (i.e. character image) areas and its "unexposed" (i.e. background) areas.

In the setting up of a negative charge image on a storage mesh secondary emission phenomena is not employed. Under these conditions the dielectric storage mesh 19 is raised by its applied *a* level potential to, say, +200 v. with respect to the photo-cathode 12 while the associated collector mesh 20 is made slightly less, say +150 v., by the applied *a* level potentials. The associated field mesh 21 and the meshes of the other storage mesh groups have potentials as indicated above for positive charge image writing.

Electrons arriving from the photo-cathode 12 are, under these negative charge image conditions, collected by the dielectric storage mesh 19 and retained without the emission of any secondary electrons.

In the next phase, marked by change of the switch means 31, 35 and 38 to position 2, *c* level potentials are applied to the storage mesh group 18 to hold the charge pattern thereon. Such *c* level potentials serve to return the meshes of the storage mesh group 18, which now lies behind the mesh group to be written on, to potentials of the order of −50 v. relative to the photo-cathode 12 in order to repel to the adjacent collector or anode ring 22 any electrons which may penetrate the now operative storage mesh group 17. Simultaneously *a* level potentials are applied to the storage mesh group 17 to render this in a charge receiving condition while the previous *b* level potentials are maintained on the storage mesh groups 15 and 16. As an image of the character 28 is still projected on to the photo-cathode 12 by the energized light source 41 a similar charge pattern representing the character 28 is set up on the dielectric storage mesh 19 of this group 17.

In the next phase, with the switch means 31, 35 and 38 in position 3, *a* level potentials are applied to the storage mesh group 16, *c* level potentials are applied to the already charged storage mesh groups 17 and 18 while *b* level potentials are still maintained on the storage mesh group 15. In similar manner to before, a charge pattern representing the character 28 is set up in the dielectric mesh 19 of the storage mesh group 16.

In the fourth phase, with the switch means 31, 35 and 38 in position 4, *a* level potentials are applied to the front storage mesh group 15 while *c* level potentials are applied to each of the other, already charged, storage mesh groups 16, 17 and 18. As the light source 41 is still energised through switch means 38, a charge pattern representing the character 28 is set up in the dielectrc mesh 19 of the storage mesh group 15.

After each of the dielectric storage meshes 19 of the mesh groups has thus been provided with its charge pattern according to the character being recognised, in the next phase, switch position 5, the character image is removed from the photo-cathode 12 by extinction of the light source 41 and instead such photo-cathode 12 is now illuminated uniformity by means of the light source 29. Simultaneously the operating potentials on the four storage mesh groups are adjusted to the *d* level.

Such *d* level potentials serve to make the photo-cathode 12 about +50 v. with respect to earth, each collector mesh 20 about +250 v. with respect to earth and each field mesh 21 about +50 v. with respect to earth. The collector plate 14 is, by its applied *d* level potentials, supplied with a potential of about +250 v. In the case of positive charge image working, the *d* level potential applied to the support mesh of each dielectric storage mesh 19 is sufficiently negative to ensure cut-off of any arriving electron flux by the "unexposed" or more negative areas of the storage mesh and also, is such that no part of the charged dielectric storage mesh surface is above the potential of the photo-cathode in order to prevent any further collection of electrons by the storage mesh. In the case of negative charge image working, the *d* level potential applied to each support mesh is sufficiently negative to ensure that the "exposed" areas cut off electron flux and that all parts of the dielectric storage mesh surface are just negative with respect to the photo-cathode 12. Under these conditions a fraction of the incident electron floodbeam will pass through small areas of the different dielectric storage meshes dependent upon the local potential of such mesh. That part of the floodbeam, having a cross section determined by the shape of the originally imaged character, which passes through the storage mesh 19 of the first group 15 will be passed on to the second mesh group 16 to be similarly modulated in transit by the storage charge on the latter and so on through the third and fourth mesh groups 17 and 18. However, during this phase of the operation cycle the switch means 35 cause the application of the chosen deflection currents to the deflection coil windings DX and DY of the different deflection coil sets 23, 24 and 25 whereby the character-shaped part of the floodbeam passing through the first dielectric storage mesh 19 of the group 15 will be deflected by the field of the deflection coil set 23 relative to the character-shaped charge pattern on the next successive dielectric storage mesh 19 of the group 16. This is illustrated, by way of an example of positive charge image working in FIG. 3 (*b*) where the outline *x*1 represents the positive charge pattern on the dielectric storage mesh 19 of group 16 and the outline *y*1 represents the electron beam arriving from the preceding storage group 15. As shown by the cross-hatched area *y*2 the fraction of the electron floodbeam able to pass through such second dielectric storage mesh will be determined by the degree of overlap between the displaced arriving part of the floodbeam and the charge pattern on such second mesh. In similar manner the applied deflection currents to the deflection coil windings DX, DY of the second reflection coil set 24 cause the further deffection (see FIG. 3(*c*)) of the beam part *y*2 passed by the storage group 16 relative to the charge pattern *x*2 set up on the dielectric storage mesh 19 of the set 17 so that only the cross-hatched part *y*3 of the beam passes through the third set 17. A similar operation takes place at the fourth storage mesh set 18 where, as shown by way of example in FIG. 3(*d*), the arriving beam part *y*3 is again displaced relative to the charge pattern *x*3 and only the cross-hatched area *y*4 passes on to the collector plate 14 as shown in FIG. 3(*e*). The number of electrons of the electron floodbeam arriving at the collector electrode 14 beyond the fourth storage mesh group 18 will be representative of the four-power auto-correlation of the imaged character and will provide an output signal of related amplitude on lead 40. The particular relative displacement pattern of the successive images is determined by the chosen manner of energisation of the different deflection coil sets 23, 24 and 25 and by appropriate variation of the respective energisation currents a scanning effect equivalent to the "nutation" mode referred to in such co-pending applications may be obtained. The waveform of the varying signal then obtained on the output lead 40 is then smiilar to those described in the earlier applications.

Electrons which do not penetrate any particular mesh group are collected by the anodes 22. The resultant currents from these electrodes are proportional to the non-correlating part of the pattern at each stage and can be combined and measured to assist in indicating the correlation between the stored charge patterns. The axial field provided by energisation of the focussing winding 26 ensures that electrons passing through one mesh group are focussed linearly on to the next although the trajectory of such electrons may be deflected between the mesh groups.

Although only one predetermined form of deflection between the different storage mesh groups has been referred to as forming phase 5 of the operation cycle, this phase may provide for the application of a series of suitably different deflection waveforms to the deflection coil sets 23, 24 and 25 in order to generate a larger number of different correlation functions from one stored character specimen since the correlation determining process does not affect the stored charge patterns. In this way a group of different correlation function signals may be obtained for each character and by comparative examination of these a decision can be made as to the identity of the character in a manner analogous to that described in the aforesaid co-pending applications.

In the final phase, switch position 6, the charge patterns are erased by the application of the suitable potential levels *e* to each mesh group while the photo-cathode 12 is uniformly illuminated by the external light source 29. Under positive charge image working the *e* potential levels applied to each collector mesh 20, each field mesh 21 and the photo-cathode 12 are substantially identical with those of the *d* level applied during the preceding "read" phase, the *e* level potential applied to the collector plate 14 being conveniently, although not essentially, earth, the *e* potential level applied to the support mesh of each of the dielectric storage meshes 19 is, say, +70 v. or +20 v. with respect to the photo-cathode 12, sufficient to make all areas positive with respect to such photo-cathode. With the prevailing flood of electrons, all areas of the dielectric storage meshes collect electrons until the whole surface of each storage mesh is at the photo-cathode potential. Under negative charge image working, the *e* potential levels applied to all meshes except the storage meshes 19, correspond to those described above for writing a positive charge image. Such dielectric storage meshes are, by the applied *e* potential level, made just negative by, say, −5 v., with respect to the associated collector mesh 20. Under the prevailing flood of electrons all areas of the storage mesh emit secondary electrons until the local potential is equal to that of the adjacent collector mesh when equilibrium conditions obtain and the whole surface of the dielectric storage mesh 19 is uniformly charged to the potential of the collector mesh 20.

The particular constructional form described is only one of many which may be devised. For example, a lesser or a greater number of storage mesh groups may be provided while a thermal cathode may be used instead of the external light source 29 for flood illumination purposes.

The use of a thermal cathode during the erasure phase greatly reduces the time needed to remove the charges on the dielectric storage meshes. Uniformity of the flood beam is not essential during erasure but is so during reading.

The choice between negative charge image working and positive charge image working depends upon a number of conditions including the nature of the input character 28. Mixed operation, i.e. with some storage mesh groups operating under positive charge image and others under negative charge image conditions, is possible and for some examination procedures essential. The negative charge image form is useful for certain purposes in that it provides the equivalent of a reversed or negative image of the input character which can be employed to introduce a test or examination to determine the absence rather than the presence of a particular character feature, i.e. to provide an equivalent of the inverse or NOT function of computor logic.

Another embodiment of the invention is shown in FIGS. 4 and 5. In this modified arrangement the tube ST1 resembles that of ST already described with reference to FIGS. 1–3 except that, instead of the collector plate 14 it is provided with a phosphor layer 43, preferably of the aluminised type as a result of which an optical output image, for example, as shown in FIG. 3(*e*) is provided instead of an electrical signal. When such a phosphor layer 43 is used, its *d* level operating potential may be of the order of +10 kv. with respect to the photo-cathode 12. All of the other components of the tube and of its associated apparatus correspond to those of FIG. 1 and are accordingly identified by similar reference characters. For simplicity many of the parts are shown only schematically.

Such an optical output form of tube may conveniently be used in conjunction with a further storage tube as shown at ST2 in FIG. 4, the output light image on the phosphor layer 43 of the tube ST1 being imaged on to the photo-cathode 112 of the tube ST2 by means of the optical system 127. The construction of this second tube is substantially identical in general form with that of the tube ST1 as also is that of the ancillary apparatus and the various parts are accordingly provided with similar references increased in value by 100. The tube ST2 is, however, provided with an additional set of beam deflection coil windings 44 disposed between the photo-cathode 112 and the first storage mesh group 115. This deflection coil set is energised, as the other deflection coil sets, from the current source 133 through intensity adjusting means 134 and distributor switch means 135. Its purpose is to allow direction of the resultant image beam from the photo-cathode 112 to different chosen areas of the dielectric storage meshes 119, in the subsequent mesh groups 115, 116, 117 and 118 in a manner which will be evident from FIG. 5(*b*) which shows the area of the dielectric storage mesh 119 of the mesh group 115 subdivided into nine separate areas I, II, III . . . IX into any one of which may be directed any image within the corresponding area 45 of the photo-cathode 112. In view of the area reduction the optical system 127 is preferably arranged to reduce the projected image size.

Such an arrangement may be used in several ways. It may be arranged to perform a comparison or matching operation between the images present in different areas I . . . IX of the different storage mesh groups. For example, the image record in area I of the mesh group 115 may be matched against the image record in area II of the mesh group 116 as shown in FIG. 5(*c*). The beam portion, shown cross-hatched at *z*1 in FIG. 5(*c*), passing the mesh group 116 may then be matched against the image record in area VII of mesh group 117 as shown in FIG. 5(*d*) and the beam portion *z*2 passing through such mesh group 117 then matched against the image record in area IX of mesh group 118 as shown in FIG. 5(*e*). The beam portion *z*3 passing through the mesh group 118 is then directed on to the phosphor layer 143 to produce an optical output which may be observed visually or directed on to a photo-multiplier tube to generate an electrical signal output. Alternatively the second tube ST2 may be provided with a collector plate corresponding to the plate 14 of the tube of FIG. 1.

The tube form shown in FIG. 4, i.e. having a phosphor layer instead of a collector plate at the output end may alternatively be used to deal with a plurality of different characters, for example, a text word simultaneously for the reason that the respective optical outputs remain separated on the output phosphor and can be sensed separately by visual inspection or photo cell means.

Yet another use for a tube as shown at ST2 in FIG. 4 and provided with the additional "addressing" deflection coil set 44 is in lieu of the tube ST in FIG. 1 or ST1 in FIG. 4 for dealing with continuously moving input characters such as those on a printed type strip. By the application of a suitable sawtooth or similar current waveform to the X deflection coil windings of such set 44 a correcting scan may be set up which effectively maintains the character image on the storage mesh group in a stationary condition in spite of the movement of the input character.

While particular embodiments have been described by way of illustrative example it will be understood that the actual constructional form may vary widely. For instance a larger or smaller number of storage mesh groups may be provided, a number of separate signal collector plates related respectively to the different image areas of the multile image area tube ST2 in FIG. 4 may be provided in place of a single plate or a single phophor layer. The arrangements described all operate upon an analogue basis but clearly both the tubes and the systems are capable of adaptation for binary form of working.

I claim:

1. Apparatus for recognising a printed or written character, said apparatus comprising means for recording an image of such character as an electrostatic charge density pattern on two or more storage meshes of a storage tube, means for directing a uniform electron flood beam on to a first of said storage meshes and from said first storage mesh to a second of said storage meshes while deflecting the beam direction in chosen manner and means for directing the beam portion emergent from the last of said storage meshes on to means for generating a representative output signal.

2. Apparatus as claimed in claim 1 in which the recorded image on at least one of said storage meshes is a positive charge pattern.

3. Apparatus as claimed in claim 2 in which the recorded image on at least one other of said storage meshes is a negative charge pattern.

4. An electrostatic storage tube suitable for use with the apparatus as claimed in claim 1 which comprises an evacuated envelope having at least one planar end wall perpendicular to the major axis of the tube envelope, a photo-cathode adjacent the inner surface of said end wall, at least two separate dielectric storage mesh groups in spaced relationship along the said major tube axis and disposed parallel to said photo-cathode and a conductive collar plate adjacent the end of said envelope remote from said photo-cathode.

5. Apparatus for recognising a printed or written character which comprises a storage tube including an input photo-cathode, at least two separate dielectric storage mesh groups in spaced relationship along the mean electron beam direction from said cathode and output signal developing means responsive to impact by electrons on the side of said storage mesh groups remote from said photo-cathode, beam deflecting means arranged to be operative on the tube beam between each pair of said storage mesh groups to shift such beam bodily to a controllable extent in a direction at right angles to said mean beam direction, means for projecting an optical image of the character to be recognized upon said photo cathode and means for providing a flood beam of electrons within said tube towards said output signal developing means through each of said storage mesh groups.

6. Apparatus according to claim 5 in which said flood beam providing means comprises a light source outside said tube and arranged to illuminate said photo-cathode substantially uniformly.

7. Apparatus according to claim 5 in which said output signal developing means comprises a collector plate electrode within the tube envelope.

8. Apparatus according to claim 5 in which said output signal developing means comprises a phosphor layer upon a wall surface of the tube for providing an optical output signal.

9. Apparatus according to claim 5 which includes additional beam deflection means arranged to be operative upon the tube beam between the input photo-cathode and the first of said storage mesh groups.

10. Apparatus according to claim 5 which includes cyclically operative control means for controlling the operating potentials of the tube electrodes whereby in turn, firstly the storage mesh group nearest said output signal developing means is conditioned to be charged by an electron beam emanating from said photo-cathode whilst the remaining storage mesh groups are rendered transparent to said electron beam, secondly said nearest storage mesh group is held in its charged condition whilst the storage mesh group next in order towards said photocathode is conditioned to be charged by said electron beam with any other storage mesh groups rendered transparent to the electron beam, thirdly repeating said second operation with any remaining storage mesh groups until all are charged, and then providing said uniform electron beam towards said output signal developing means with all of said storage mesh groups conditioned to modulate said beam as it passes therethrough.

11. Apparatus according to claim 10 in which said beam deflecting means comprises a pair of electromagnetic coil windings to control beam reflection respectively in mutually perpendicular directions.

12. Apparatus according to claim 11 in which said flood beam providing means comprises a light source outside said tube and arranged to illuminate said photo-cathode.

13. Apparatus according to claim 12 which includes additional beam deflection means arranged to be operative upon the tube beam between the input photo-cathode and the first of said storage mesh groups.

14. Apparatus according to claim 13 in which said output signal developing means comprises a collector plate electrode within the tube envelope.

15. Apparatus according to claim 13 in which said output signal developing means comprises a phosphor layer upon a wall surface of the tube for providing an optical output signal.

16. Apparatus according to claim 5 in which said beam deflecting means comprise a pair of electromagnetic coil windings to control beam deflection respectively in mutually perpendicular directions.

References Cited

UNITED STATES PATENTS

| | | | |
|---|---|---|---|
| 3,128,406 | 4/1964 | Goetze et al. | 313—89 X |
| 3,201,630 | 8/1965 | Orthuber et al. | 313—89 X |
| 3,202,855 | 8/1965 | Callick et al. | 313—89 X |
| 3,249,784 | 5/1966 | Burns | 315—12 X |

RALPH G. NILSON, *Primary Examiner.*

J. D. WALL, *Assistant Examiner.*